(12) United States Patent  (10) Patent No.: US 8,914,905 B2
Okuyama et al.  (45) Date of Patent: Dec. 16, 2014

(54) ACCESS CONTROL SYSTEM, COMMUNICATION TERMINAL, SERVER, AND ACCESS CONTROL METHOD

(75) Inventors: Gen Okuyama, Tokyo (JP); Yoshinori Miyamoto, Tokyo (JP); Takuya Murakami, Tokyo (JP)

(73) Assignee: NEC Corporation, Tokyo (JP)

( * ) Notice: Subject to any disclaimer, the term of this patent is extended or adjusted under 35 U.S.C. 154(b) by 23 days.

(21) Appl. No.: 13/508,503

(22) PCT Filed: Oct. 5, 2010

(86) PCT No.: PCT/JP2010/005970
§ 371 (c)(1),
(2), (4) Date: May 7, 2012

(87) PCT Pub. No.: WO2011/055486
PCT Pub. Date: May 12, 2011

(65) Prior Publication Data
US 2012/0227114 A1    Sep. 6, 2012

(30) Foreign Application Priority Data

Nov. 9, 2009   (JP) .................. 2009-255908

(51) Int. Cl.
*H04L 29/06* (2006.01)
*G06F 21/00* (2013.01)
*G06F 15/00* (2006.01)
*H04L 9/32* (2006.01)
*H04L 12/66* (2006.01)

(52) U.S. Cl.
CPC .......... *H04L 63/0823* (2013.01); *H04L 63/102* (2013.01)
USPC .................. 726/29; 726/10; 726/14; 726/26; 713/156; 713/168; 713/175

(58) Field of Classification Search
USPC ........... 726/29, 10, 26, 14; 713/168, 175, 156
See application file for complete search history.

(56) References Cited

U.S. PATENT DOCUMENTS 6,044,155 A    3/2000  Thomlinson et al.
6,253,324 B1   6/2001  Field et al.
(Continued)

FOREIGN PATENT DOCUMENTS

JP    H11-85622 (A)    3/1999
JP    2003-526858 (A)  9/2003
(Continued)

OTHER PUBLICATIONS

Saito, T. ; Umesawa, K. ; Kito, T. ; Okuno, H.G.; "Privacy-enhanced SPKI access control on PKIX and its application to Web server"; Advanced Information Networking and Applications, 2003. AINA 2003. 17th International Conference on DOI: 10.1109/AINA.2003. 1192970; Publication Year: Jul. 2003; pp. 696-703.*

(Continued)

*Primary Examiner* — Andrew Nalven
*Assistant Examiner* — Courtney Fields
(74) *Attorney, Agent, or Firm* — McGinn IP Law Group, PLLC

(57) ABSTRACT

Terminal certification means of a communication terminal manages a content and certification information on the content in association with each other. Upon access to a server associated with the execution of the content, request means sends the server a request including certification information associated with the content. In response to the request from the communication terminal, the server uses server certification means to certify the request. Access control means performs access control based on policy information stored in policy information storage means.

10 Claims, 7 Drawing Sheets

(56) References Cited

U.S. PATENT DOCUMENTS

| | | | |
|---|---|---|---|
| 6,272,631 | B1 | 8/2001 | Thomlinson et al. |
| 6,532,542 | B1 | 3/2003 | Thomlinson et al. |
| 6,950,809 | B2 | 9/2005 | Dahan et al. |
| 7,073,199 | B1 | 7/2006 | Raley |
| 7,506,034 | B2 | 3/2009 | Coates et al. |
| 8,060,746 | B2 | 11/2011 | Kojima |
| 2002/0166049 | A1* | 11/2002 | Sinn .................. 713/175 |
| 2006/0143700 | A1* | 6/2006 | Herrmann .................. 726/14 |
| 2008/0263625 | A1 | 10/2008 | Gomez et al. |
| 2009/0205037 | A1 | 8/2009 | Asakura |
| 2011/0040972 | A1* | 2/2011 | Attia et al. ............ 713/168 |
| 2013/0283042 | A1* | 10/2013 | Xiao .................. 713/156 |

FOREIGN PATENT DOCUMENTS

| | | |
|---|---|---|
| JP | 2004-500660 (A) | 1/2004 |
| JP | 2004062417 A * | 2/2004 |
| JP | 2004-507848 A | 3/2004 |
| JP | 2006-260490 (A) | 9/2006 |
| JP | 2007-128313 | 5/2007 |
| JP | 2008-136063 (A) | 6/2008 |
| JP | 2009-054086 A | 3/2009 |
| WO | WO 01/67707 (A2) | 9/2001 |
| WO | WO 02/19628 A1 | 3/2002 |
| WO | WO2006/001524 A1 | 1/2006 |

OTHER PUBLICATIONS

International Search Report in PCT/JP2010/005970 Dated Dec. 21, 2010 (English Translation Thereof).

Hiroshi Maruyama, et al. "Tokushu Internet, On Security of Signed Java and ActiveX Codes", Computer Software, vol. 16, No. 4, Jul. 15, 1999, vol. 16, No. 4, pp. 23 to 32.

Japanese Office Action dated Jul. 22, 2014, with English translation.

* cited by examiner

| URL OF APPLICATION | HASH VALUE FOR CERTIFICATE |
|---|---|
| http://appserver1/app12 | 92q8sldkfjd038u |

| APPLICATION ID | REQUESTED CONTENT | CERTIFICATION INFORMATION |
|---|---|---|
| http://appserver1/app12 | data001 | 92q8sldkfjd038u |

| ID OF CA | ACCESSIBLE DATA |
|---|---|
| CA_1 | data001, data002, data003 |
| CA_2 | data003, data004 |
| CA_3 | data002 |

| APPLICATION ID | REQUESTED CONTENT | ID OF CA |
|---|---|---|
| http://appserver1/app12 | data001 | CA_1 |

| URL OF WEB SERVER | HASH VALUE FOR CERTIFICATE |
|---|---|
| http://appserver1.com | 3jlsdk0dl03j0817eub |

```
GET method=getData&value=data001/HTTP1.1
host: appserver3.com
...
referer: https://appserver1.com
x-cert-hash: 3jlsdk0dl03j0817eub
```

| ID OF CA | HASH VALUE |
|---|---|
| CA_1 | 3jlsdk0dl03j0817eub |
| CA_2 | sd203dk06nvo3iso2 |
| CA_3 | l82k5eneoi3c8el31v |

ACCESS CONTROL SYSTEM, COMMUNICATION TERMINAL, SERVER, AND ACCESS CONTROL METHOD

TECHNICAL FIELD

The present invention relates to an access control system, a communication terminal, a server, and an access control method, and particularly to an access control system, a communication terminal, a server, and an access control method capable of being applied to providing services through a communication network.

BACKGROUND ART

Many web services are provided through the Internet. A server (web server) provides a service in response to a request from a client terminal. Specifically, for example, services provided include information providing services through websites, providing web applications (application programs), and providing other kinds of information. Some of web servers are configured to change display layouts or decide on whether to provide services on a per client-terminal basis.

A user agent (UA) given to an HTTP (HyperText Transfer Protocol) request header is often used as client terminal determination means.

A web server can refer to the UA to determine a client terminal. Specifically, the type of a web browser program being used (hereinafter, simply called a web browser or a browser as well) or the model name of a client terminal can be identified. However, for example, it cannot determine which application is to run on a web browser like a web application.

Therefore, the web server cannot make determinations on whether to provide a service to trusted applications and not to provide the service to the others. To enable such determinations, it is required a mechanism for notifying a web server of the feature of a calling application from a client terminal when the application running on the client terminal accesses the web server, i.e., for example, when the client terminal makes a connection request to the web server through the Internet under the control of an application program installed thereon. Note that the feature of an application means, for example, an origin of the application (specifically, for example, a creator of the application or an authority that has certified the creator).

The confirmation of an application feature is made through a certification process, and a signature affixed to the application is often used in the certification process. In the certification process, it is verified whether a certificate for the signature was issued by a trusted certificate authority (CA) to determine whether the application is trusted. Whether the CA is trusted is generally determined by a certificate called a root certificate issued by a root certificate authority.

As a method of notifying the web server of the application feature, there is considered a method of notifying the web server of the result of the certification process executed by the client terminal. For example, the client terminal verifies an SSL (Secure Sockets Layer) certificate sent from web server A to execute a certification process for determining whether an application provided by the web server A is trusted. Then, the application sends the result of the certification process to server B as an access destination. Based on the sent certification result, the web server B can determine whether it is a connection request from a trusted application to restrict access (restrict connection processing).

Patent Literature (PTL) 1 discloses a system equipped with an access control server for determining the advisability of a connection to a service providing server.

CITATION LIST

Patent Literature

PTL 1: Japanese Patent Application Publication No. 2009-54086 (Paragraphs 0009 to 0043, and FIG. 1)

SUMMARY OF INVENTION

Technical Problems

Since any root certificate contained in a web browser can be added by a user, the above-mentioned method of notifying the web server of the application feature may cause a case where information such as the root certificate is information untrusted for the web server. However, even if a certification process is executed on the application based on such an added root certificate, the client terminal will certify that the application is trusted. As a result, since the web server recognizes that the request to the web server from the application installed on the client terminal is a request from a trusted application, accesses unintended by the web server to allow may be made. In other words, when a root certificate is added, a connection request to be originally denied by the web server may be allowed.

The system described in PTL 1 uses an access control server for determining the advisability of a connection to a service providing server, and this causes a problem that the introduction and management of the system is costly. Further, since the system described in PTL 1 is to determine the advisability of the connection to the service providing server on a user-by-user basis, access unintended originally by the web server to allow may be made from an application used by a user the connection of which is allowed.

It is an object of the present invention to provide an access control system, a communication terminal, a server, and an access control method capable of denying access in response to an access request from an application the connection of which is not intended by the server to allow.

Solution to Problem

The access control system according to the present invention is an access control system including a server and a communication terminal connected to the server through a communication network, characterized in that the communication terminal includes terminal certification means for executing a certification process on a content using an electronic certificate added to the content and managing, in association with each other, the content certified in the certification process and certification information on the content as information based on the electronic certificate to indicate that the content is certified in the certification process, and request means which, upon accessing the server, sends the server a request including the certification information on the content and requested content information indicative of a process requested of the server, and the server includes policy information storage means for prestoring policy information indicating whether to execute the process according to the request based on the certification information and the requested content information included in the request sent from the communication terminal, server certification means for certifying the request based on the certification information included in the request sent from the communication terminal, access control means which, when the server certification means certifies the request, decides on whether to execute the process indicated by the requested content information based on the policy information stored in the policy information storage means, and the certification information and the requested content information included in the request, and process execution means for executing the process when the access control means decides to execute the process indicated by the requested content information.

The access control system according to another aspect of the present invention is an access control system including a server and a communication terminal connected to the server through a communication network, characterized in that the communication terminal includes terminal certification means for executing a certification process on a content using an electronic certificate added to the content and managing, in association with each other, the content certified in the certification process and certification information on the content as information based on the electronic certificate to indicate that the content is certified in the certification process, verification means which, upon accessing the server, verifies whether the electronic certificate used in the certification process for the content is a predetermined electronic certificate, and request means which, when the verification means determines that the electronic certificate used in the certification process is the predetermined electronic certificate, sends the server a request including the certification information on the content and requested content information indicative of a process requested of the server, and the server includes policy information storage means for prestoring policy information indicating whether to execute the process according to the request based on the certification information and the requested content information included in the request sent from the communication terminal, access control means for deciding on whether to execute the process indicated by the requested content information based on the policy information stored in the policy information storage means, and the certification information and the requested content information included in the request, and process execution means for executing the process when the access control means decides to execute the process indicated by the requested content information.

The communication terminal according to the present invention is a communication terminal requesting a server to execute a process through a communication network, characterized by including: certification means for executing a certification process on a content using an electronic certificate added to the content and managing, in association with each other, the content certified in the certification process and certification information as information based on the electronic certificate to indicate that the content is certified in the certification process; and request means for sending a request, including the certification information on the content and requested content information indicative of a process requested of the server, to the server on which the process is executed according to the certification information on the content and the requested content information.

The communication terminal according to another aspect of the present invention is a communication terminal requesting a server to execute a process through a communication network, characterized by including: certification means for executing a certification process on a content using an electronic certificate added to the content and managing, in association with each other, the content certified in the certification process and certification information on the content as information based on the electronic certificate to indicate that the content is certified in the certification process; verification means which, upon accessing the server, verifies whether the electronic certificate used in the certification process for the content is a predetermined electronic certificate; and request means which, when the verification means determines that the electronic certificate used in the certification process is the predetermined electronic certificate, sends a request, including the certification information on the content and requested content information indicative of a process requested of the server, to the server on which the process is executed according to the certification information on the content and the requested content information.

The server according to the present invention is a server executing a process in response to a request sent from a communication terminal through a communication network, characterized by including: policy information storage means for prestoring policy information indicating whether to execute the process according to the request based on requested content information indicative of the request sent sent from the communication terminal and certification information based on an electronic certificate of the content on which a process is being executed by the communication terminal; certification means for certifying the request based on the certification information sent from the communication terminal; access control means which, when the certification means certifies the request, decides on whether to execute the process indicted by the requested content information based on the policy information stored in the policy information storage means, the certification information, and the requested content information; and process execution means for executing the process when the access control means decides to execute the process indicated by the requested content information.

The server according to another aspect of the present invention is a server executing a process in response to a request sent from a communication terminal through a communication network, characterized by including: policy information storage means for prestoring policy information indicating whether to execute the process according to the request based on requested content information indicative of the request sent from the communication terminal and certification information based on an electronic certificate of the content on which a process is being executed by the communication terminal; access control means for deciding on whether to execute the process indicated by the requested content information based on the policy information stored in the policy information storage means, the certification information, and the requested content information; and process execution means for executing the process when the access control means decides to execute the process indicated by the requested content information.

The access control method according to the present invention is an access control method by which a server executes a process in response to a request from a communication terminal, characterized in that the method, in the communication terminal, includes executing a certification process on a content using an electronic certificate added to the content and managing, in association with each other, the content certified in the certification process and certification information on the content as information based on the electronic certificate to indicate that the content is certified in the certification process, and upon accessing the server, sending the server a request including the certification information on the content and requested content information indicative of a process requested of the server, and the method, in the the server, includes executing a process for certifying the request based on the certification information included in the request sent from the communication terminal; when the request is certified, deciding on whether to execute the process indicated by the requested content information based on policy information indicating whether to execute the process according to the request, and the certification information and the requested content information included in the request; and executing the process when it is decided that the process indicated by the requested content information is executed.

The access control method according to another aspect of the present invention is an access control method by which a server executes a process in response to a request from a communication terminal, characterized in that the method, in the communication terminal, includes executing a certification process on a content using an electronic certificate added to the content and managing, in association with each other, the content certified in the certification process and certification information on the content as information based on the electronic certificate to indicate that the content is certified in the certification process, upon accessing the server, executing a verification process for verifying whether the electronic certificate used in the certification process for the content is a predetermined electronic certificate, and when it is determined in the verification process that the electronic certificate used in the certification process is the predetermined electronic certificate, sending the server a request including the certification information on the content and requested content information indicative of a process requested of the server, and the method, in the server, includes deciding on whether to execute the process indicated by the requested content information based on policy information indicating whether to execute the process according to the request, and the certification information and the requested content information included in the request, and executing the process when it is decided that the process indicated by the requested content information is executed.

Advantageous Effects of Invention

According to the present invention, access in response to an access request from an application unintended by the server to allow can be denied. In other words, access control can be performed on an application-by-application basis.

DESCRIPTION OF EMBODIMENTS

Exemplary Embodiment 1

Figure 1:
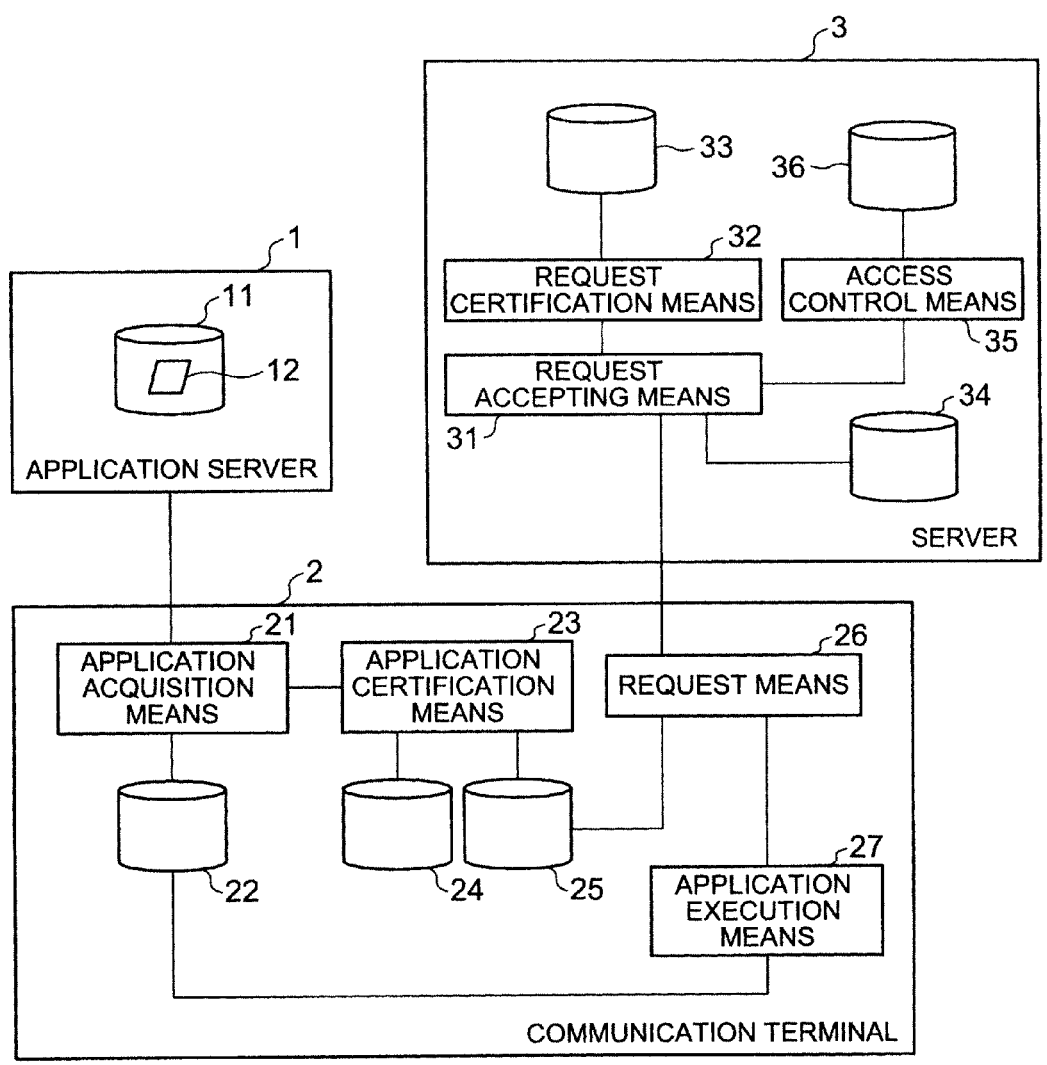
FIG. 1 is a block diagram showing a configuration example of an access control system of a first exemplary embodiment according to the present invention.

An access control system of a first exemplary embodiment according to the present invention will be described with reference to the accompanying drawings. FIG. 1 is a block diagram showing a configuration example of the access control system of the first exemplary embodiment according to the present invention.

As shown in FIG. 1, the access control system of the first exemplary embodiment according to the present invention includes a communication terminal 2 and a server 3, where an application server 1 is connected to the communication terminal 2. The communication terminal 2 is also connected to the server 3.

The application server 1 includes an application storage section 11 in which an application 12 as an application program provided to the communication terminal 2 is stored. The application 12 is downloaded by the communication terminal 2.

The communication terminal 2 includes application acquisition means 21, an application storage section 22, application certification means 23, a certificate storage section 24, a certification information storage section 25, request means 26, and application execution means 27.

The server 3 includes request accepting means 31, request certification means 32, a certificate storage section 33, a service storage section 34, access control means 35, and a policy storage section 36.

Referring next to the block diagram and flowcharts, the operation of the access control system of the exemplary embodiment will be described.

The operation of the access control system is divided into the following three operations: (1) an application certification process executed by the communication terminal 2, (2) a request process from the communication terminal 2 to the server 3, and (3) a request certification process performed by the server 3. The following will describe respective processes in the exemplary embodiment.

Figures 2, 3:
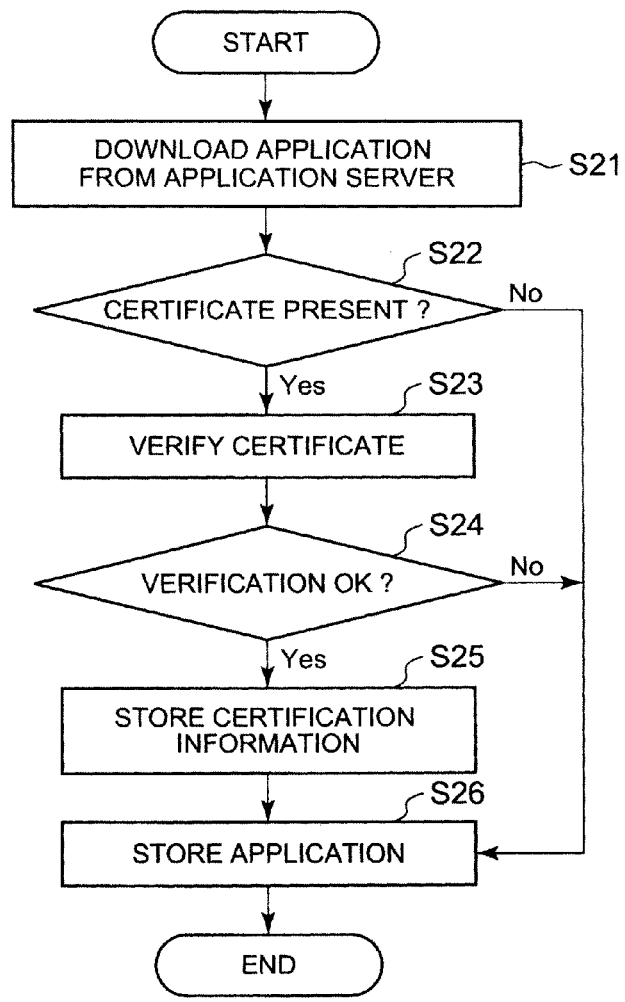
FIG. 2 is a flowchart showing an application certification process.
FIG. 3 is an explanatory drawing showing an example of application information and a verification result stored in a certification information storage section in association with each other.

First, (1) the application certification process executed by the communication terminal 2 will be described with reference to the accompanying drawings. FIG. 2 is a flowchart showing the application certification process. The application acquisition means 21 of the communication terminal 2 downloads (DL) the application 12 from the application server 1 (step S21).

When a certificate is added to the application 12 (Yes in step S22), the application certification means 23 execute a certificate verification process (certification process) (step S23). For example, the certificate (electronic certificate) is electronic data signed by a CA or the like in an electronic manner. For example, the certificate includes the name of a certificate holder, a public key of the certificate holder, the ID of the CA, an electronic signature of the CA, and the like.

The certificate verification process is, for example, a process of determining whether a certificate stored in the certificate storage section 24 agrees with the certificate added to the application 12. The certificate verification process may be executed by any other method.

When determining in the certificate verification process in step S23 that the certificate stored in the certificate storage section 24 agrees with the certificate added to the application 12 (Yes in step S24), the application certification means 23 stores certification information in the certification information storage section 25 as a verification result (step S25). Specifically, the application certification means 23 stores the application information in the certification information storage section 25 in association with certification information. When the certificate stored in the certificate storage section 24 agrees with the certificate added to the application 12, the certification information is stored in the certification information storage section 25 as the verification result. Therefore, the certification information stored in the certification information storage section 25 means that the application indicated by the application information associated with the certification information is certified in the certificate verification process (certification process).

FIG. 3 is an explanatory drawing showing an example of the application information and the verification result stored in the certification information storage section 25 in association with each other. In the example shown in FIG. 3, the application information is a URL (Uniform Resource Locator) indicating a storage location of the application 12. Further, in the example shown in FIG. 3, the certification information is a hash value for the certificate added to the application 12. In the example shown in FIG. 3, the application information is "http://appserver1/app12." In the example shown in FIG. 3, the hash value as the certification information is "92q8sldkfjd038u." Then, in FIG. 3, it is shown that the URL indicative of the storage location of the application 12 as the application information on the application 12 and the hash value for the certificate added to the application 12 are stored in the certification information storage section 25 in association with each other. In this example, the certification information is the hash value for the certificate added to the application 12.

Then, the application acquisition means 21 stores, in the application storage section 22, the application 12 downloaded from the application server 1 in the processing step S21 (step S26).

Figures 4, 5:
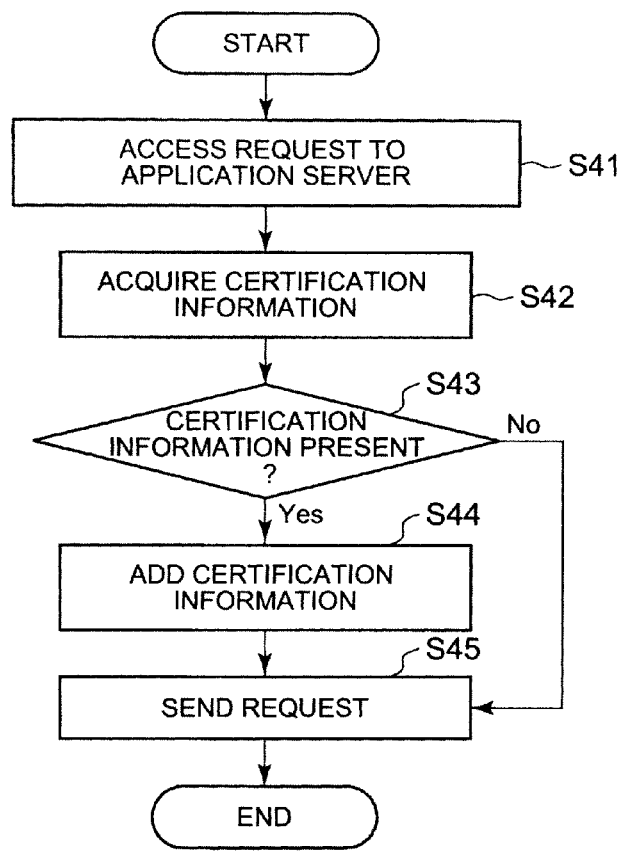
FIG. 4 is a flowchart showing a request process.
FIG. 5 is an explanatory drawing showing an example of access request information in the first exemplary embodiment.

Next, (2) the request process from the communication terminal 2 to the server 3 will be described. FIG. 4 is a flowchart showing the request process. The following will be described by taking as an example a case where the communication terminal 2 accesses the server 3 based on the program control of the application 12 downloaded by the communication terminal 2 in the above processing step S21 (when it makes a connection request (access request)). During execution of the application 12 stored in the application storage section 22, the application execution means 27 outputs, to the request means 26, an instruction given to make an access request to the server 3 (hereinafter, simply called the access request) based on the program control of the application 12 (step S41).

In response to receipt of the access request, the request means 26 acquires certification information corresponding to the application 12 from the certification information storage section 25 (step S42). Specifically, it tries to acquire the certification information. In the example shown in FIG. 3, since the certification information associated with the URL of the application 12 is stored in the certification information storage section 25 (Yes in step S43), the hash value for the certificate as the certification information is obtained by using, as a key, the ID of the application 12 (specifically, the URL indicative of the storage location of the application 12). After acquiring the certification information, the request means 26 adds the certification information to the access request (step S44), and sends a request (access request information) to the server 3 (step S45). FIG. 5 is an explanatory drawing showing an example of the access request information in the exemplary embodiment. In the example shown in FIG. 5, the access request information includes the ID of a calling application (the URL of the application 12), a content requested (requested content information), and certification information. In the example shown in FIG. 5, the access request information is information requested by the application 12 to the server 3 to send data001.

Figures 6, 7:
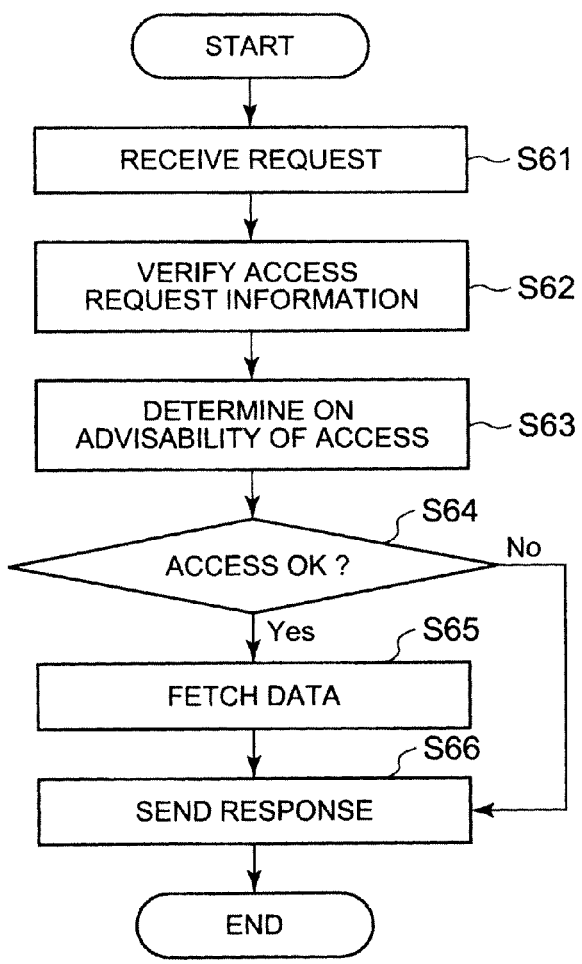
FIG. 6 is a flowchart showing a request certification process.
FIG. 7 is an explanatory drawing showing an example of a policy stored in a policy storage section.

Next, (3) the request certification process executed by the server 3 will be described with reference to the accompanying drawings. FIG. 6 is a flowchart showing the request certification process. The request accepting means 31 receives an access request (specifically, access request information) from the communication terminal 2 (step S61), and passes the access request information to the request certification means 32 to perform verification (step S62).

The request certification means 32 fetches certification information from the access request information to check whether it matches a certificate prestored in the certificate storage section 33. In this example, as shown in FIG. 5, since the access request information includes a hash value for a certificate as the certification information, the request certification means 32 calculates a hash value for the certificate prestored in the certificate storage section 33 to check whether the hash value as the calculation result matches the hash value indicated by the certification information.

Here, it is assumed that the hash value indicated by the certification information matches a hash value for a certificate issued by a certificate authority a (CA_1) prestored in the certificate storage section 33. After that, the access control means 35 refers to a policy stored in the policy storage section 36 to determine the advisability of access (step S63). Note that the policy (policy information) is information indicating by which certificate authority a certificate contained in an application has issued and which data the application is allowed to access. In the policy storage section 36, IDs of certificate authorities (e.g., CA_1, CA_2, CA_3) and data (e.g., data001, data002, data003, data004) to which access is allowed for each ID of the certificate authorities are stored.

FIG. 7 is an explanatory drawing showing an example of the policy stored in the policy storage section 36. In the example shown in FIG. 7, it is shown that a policy for allowing an application having a certificate issued by certificate authority a (CA_1) to access data001, data002, and data003, an application having a certificate issued by certificate authority b (CA_2) to access data003 and data004, and an application having a certificate issued by certificate authority c (CA_3) to access data002 is stored in the policy storage section 36.

In this example, since the hash value included in the access request information matches the hash value for the certificate issued by the certificate authority a (CA_1), the application 12 is allowed to access data001 (Yes in step S64). When the access is allowed (Yes in step S64), the request accepting means 31 fetches data (data001) from the service storage section 34 (step S65), and returns a response to the communication terminal 2 (step S66). Specifically, the fetched data (data001) is sent to the communication terminal 2.

In the exemplary embodiment, since the communication terminal 2 sends certification information on an application to the server 3, the server 3 can figure out upon which application the request is based (specifically, by which certificate authority the application is certified). Since the server 3 verifies the certification information, the validity of the certification process executed by the communication terminal 2 is confirmed. Further, access control can be performed according to a policy stored in the policy storage section 36 of the server 3. Even if the user of the communication terminal 2 adds a certificate to the certificate storage section 24 and the application is certified by the certificate, since the access can be denied in the request certification process and access control using the policy performed by the server 3, the server 3 will not allow unintended access. In other words, a policy based on a certificate issued by a predetermined certificate authority can be set for the server 3 to perform access control on each application.

Thus, in the exemplary embodiment, the server can restrict access for each requester's content. The reason is that the communication terminal sends the server the request with the content of the certification information added thereto. Further, the server can restrict access according to a server's policy. The reason is that the server side has a mechanism for performing certification again according to its own policy based on the certification information sent from the communication terminal.

Exemplary Embodiment 2

Figure 8:
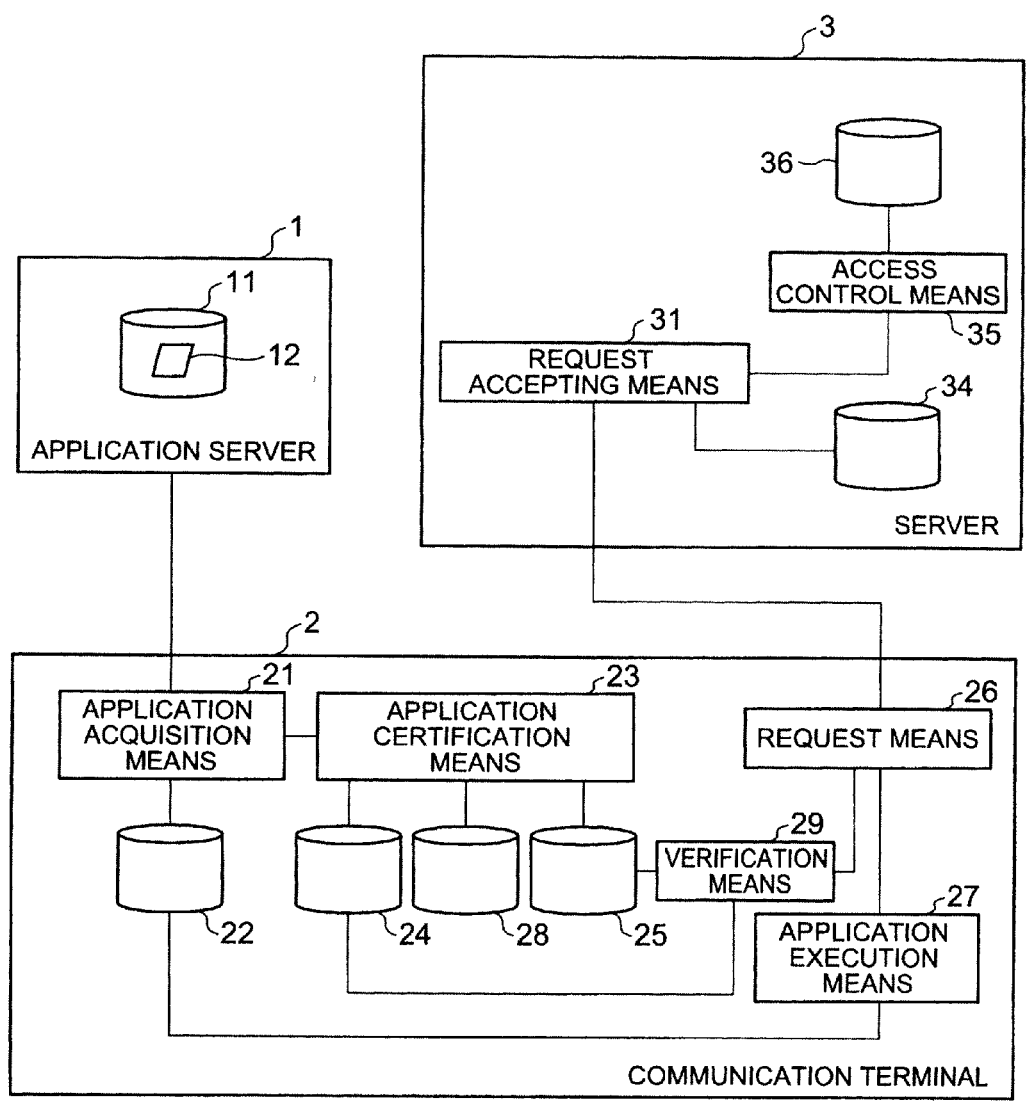
FIG. 8 is a block diagram showing a configuration example of an access control system of a second exemplary embodiment according to the present invention.

An access control system of a second exemplary embodiment according to the present invention will be described with reference to the accompanying drawings. FIG. 8 is a block diagram showing a configuration example of the access control system of the second exemplary embodiment according to the present invention.

As shown in FIG. 8, in the access control system of the second exemplary embodiment according to the present invention, an additional certificate storage section 28 and verification means 29 are added to the communication terminal 2 in the first exemplary embodiment shown in FIG. 1. Further, the server 3 in the access control system of the second exemplary embodiment according to the present invention does not include the request certification means 32 and the certificate storage section 33. In the additional certificate storage section 28, a certificate added by the user of the communication terminal 2 is stored. The verification means 29 verifies, in a certificate verification process, whether a certificate matching the certificate added to the application 12 is the certificate stored in the certificate storage section 24.

The operation of the access control system of the exemplary embodiment will be described. In the exemplary embodiment, in the processing step S23 of (1) the application certification process executed by the communication terminal 2 shown in FIG. 2, it is determined whether the certificate added to the application 12 matches the certificate stored in the certificate storage section 24 or the certificate stored in the additional certificate storage section 28. Since the other processing is the same as (1) the application certification process executed by the communication terminal 2 in the first exemplary embodiment shown in FIG. 2, the description thereof will be omitted.

Figures 9, 10, 11:
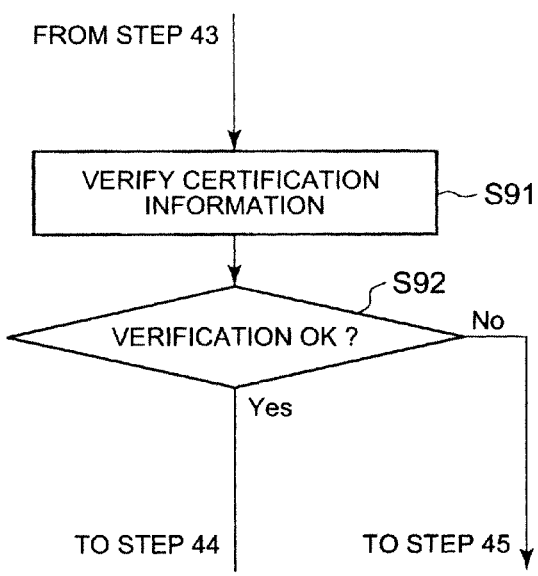
FIG. 9 is a flowchart showing processing added in the second exemplary embodiment to (2) a request process from a communication terminal 2 to a server 3 in the first exemplary embodiment shown in FIG. 4.
FIG. 10 is an explanatory drawing showing an example of access request information in the second exemplary embodiment.
FIG. 11 is an explanatory drawing showing the URL of a web server and a hash value for a certificate stored in a certification information storage section in the exemplary embodiment.

Next, (2) the request process from the communication terminal 2 to the server 3 in the exemplary embodiment will be described. FIG. 9 is a flowchart showing processing added in the exemplary embodiment to the (2) the request process from the communication terminal 2 to the server 3 in the first exemplary embodiment shown in FIG. 4.

In the first exemplary embodiment, the request means 26 acquires the certification information in the processing step S42 shown in FIG. 4, while in the exemplary embodiment, the verification means 29 acquires certification information from the certification information storage section 25 after the request means 26 acquires the certification information (step S91).

Further, in the first exemplary embodiment, when there is the certification information in the processing step S43 shown in FIG. 4, the processing (step S44) for adding the certification information is performed. However, in the second exemplary embodiment, the verification means 29 verifies the certification information before the processing step S44 (step S91). The verification means 29 checks whether the certification information is verified by the certificate stored in the certificate storage section 24 in the processing step S23 of (1) the application certification process executed by the communication terminal 2.

Specifically, a hash value for the certificate stored in the certificate storage section 24 is calculated to check whether the hash value matches the hash value for the certificate added to the application 12 illustrated in FIG. 3. When they match, the verification means 29 determines that the request is from the application verified by the certificate stored in the certificate storage section 24. When they do not match, it determines that the request is verified by the added certificate stored in the additional certificate storage section 28.

When it is determined that the request is verified by the certificate stored in the certificate storage section 24 (Yes in S92), the procedure moves to the processing step S44. In the first exemplary embodiment, the request means 26 adds, in the processing step S44, a hash value to the access request as certification information, while in the second exemplary embodiment, the request means 26 adds, in the processing step S44, the ID of the certificate authority to the access request. FIG. 10 is an explanatory drawing showing an example of access request information in the exemplary embodiment. The access request information in the exemplary embodiment shown in FIG. 10 includes the ID of a calling application (the URL of the application 12), a content requested, and the ID of a certificate authority. The request means 26 acquires the ID of the certificate authority from the certificate stored in the certificate storage section 24.

Next, (3) the request certification process executed by the server 3 in the exemplary embodiment will be described. In the first exemplary embodiment, the verification process is executed on the access request information in step S62 of FIG. 6, while in the exemplary embodiment, the procedure moves to the processing step S63 after completion of the processing step S61 without performing the processing step S62. In other words, as shown in FIG. 10, since the ID of the certificate authority is included in the certification information sent from the communication terminal 2 to the server 3, the procedure moves to the determination on the advisability of access in step S63 after completion of the processing step S61. Since the subsequent processing is the same as that in the first exemplary embodiment, the description thereof will be omitted.

In the exemplary embodiment, the certificate originally installed on the communication terminal 2 (prestored in the certification information storage section 25) and the added certificate (stored in the additional certificate storage section 28) are managed separately. Then, it is configured that, when the hash value for the certificate of the application matches the hash value for the certificate originally installed, the ID of the certificate authority is sent to the server 3. Therefore, when the communication terminal 2 accesses the server 3, the server 3 can determine whether the accessing application is certified by the certificate originally installed. Thus, unlike in the first exemplary embodiment, there is no need for the server 3 side to execute the request certification process. This can lead to reduction in the processing load on the server 3.

In the exemplary embodiment, it is predicated that the certificate managed on the server 3 side (the certificate stored in the certificate storage section 33) in the first exemplary embodiment is identical to the certificate managed on the communication terminal 2 (the certificate stored in the certificate storage section 24).

Other exemplary embodiments of the present invention will be described below. In the first exemplary embodiment mentioned above, the hash value for the certificate is stored in the certification information storage section 25 in the processing step S25 shown in FIG. 2. This hash value may be calculated from the certificate using a unique hash function or using a fingerprint stored in the certificate. Further, it may be calculated using a fingerprint decrypted from an encrypted fingerprint stored in the certificate.

Further, although in the first exemplary embodiment, the certification information sent from the communication terminal 2 to the server 3 is the hash value for the certificate, but it is not limited thereto. The certificate itself may also be sent.

Further, although in the first exemplary embodiment, when a request is made from the communication terminal 2, the request certification means 32 of the server 3 calculates a hash value for the certificate stored in the certificate storage section 33 in step S62 shown in FIG. 6, but it is not limited thereto. The request certification means 32 may be configured to pre-calculate the hash value for the certificate stored in the certificate storage section 33 so as to make only a comparison when the request is made.

Further, although in the first exemplary embodiment, the request means 26 acquires certification information corresponding to the requesting application from the certification information storage section 25 before sending the request from the communication terminal 2 to the server 3, but it is not limited thereto. It would be enough for the request means 26 to be able to acquire the certification information corresponding to the requesting application. For example, since there is an API (Application Programming Interface) such as getCertificate ( ) function to acquire a certificate corresponding to the requesting application, the request means 26 may issue this to acquire the certificate, calculate a hash value from the certificate, and send it to the server 3. According to this method, when the communication terminal 2 executes the application certification process, the certification result does not need to be stored in the certification information storage section 25.

Further, in the first exemplary embodiment and the second exemplary embodiment, it is predicated that the certificate stored in the certificate storage section 33 of the server 3 will not be updated, but this is not limited thereto. Means may be provided to notify the communication terminal 2 of the updated certificate to update the certificate stored in the certificate storage section 24 on the communication terminal 2. In this case, certificate update means may be provided on the communication terminal 2 to provide such a mechanism that the server 3 sends a notification or the communication terminal 2 performs polling periodically to update the certificate stored in the certificate storage section 24.

Further, in the second exemplary embodiment, the certificate storage section 24 and the additional certificate storage section 28 are provided separately as shown in FIG. 8, but they may be the same storage section as long as they are separated logically. In other words, it has just to be configured that the verification means 29 can know whether the application is verified by the originally installed certificate before the request is sent from the communication terminal 2 to the server 3.

Further, in the first exemplary embodiment and the second exemplary embodiment, when the communication terminal 2 sends the request to the server 3, the application ID is sent together as illustrated in FIG. 5, but it is not limited thereto. The application ID may not be sent as long as the certification information, i.e., information on the certificate authority to indicate from which the application has won an endorsement is included in the access request information.

Further, in the first exemplary embodiment and the second exemplary embodiment, a table is used to associate between the ID of a CA illustrated in FIG. 7 and accessible data in the determination on the advisability of access in step S63 shown in FIG. 6, but the association is not limited to this combination. The association may be between an URL and accessible data, or a combination of the ID of the CA, the URL, and the accessible data.

EXAMPLE

Next, the operation of the access control system according to the present invention will be described by using a specific example. In the example, description will be made by taking as an example a case where a communication terminal (communication terminal 2) executes a web application stored on a web server (application server 1) to access data stored on the server (server 3) when a web browser installed on the communication terminal is running.

First, (1) the application certification process executed by the communication terminal 2 will be described. The user of the communication terminal 2 uses the web browser to access the web server (application server 1) (perform connection processing). When the URL of the web server starts with "https," it is indicated that SSL communication is performed, and hence a certificate is exchanged between the web server and the communication terminal 2.

Specifically, for example, the application certification means 23 uses the certificate sent from the application server 1 and the root certificate stored in the certificate storage section 24 to check whether the web application is authorized by a certificate authority in which the web server is trusted. In this example, it is assumed that the URL of the application server 1 and the hash value for the root certificate are stored in the certification information storage section 25 in association with each other on the precondition that the application server 1 is trusted. FIG. 11 is an explanatory drawing showing the URL of the web server and the hash value for the certificate stored in the certification information storage section 25 in this example. In this example, as shown in FIG. 11, "https://appserver1.com" as the URL of the web server and "3jlsdk0d103j0817eub" as the hash value for the root certificate are stored in the certification information storage section 25.

After confirmation of the web application using the root certificate, an HTML (HyperText Markup Language) file of the website is displayed. When the web application is included in this HTML file, the web application is executed when the browser is running. Specifically, the application execution means 27 executes the web application stored in the application storage section 22.

Next, (2) the request process from the communication terminal 2 to the server 3 will be described. The web application issues the API of the server 3 (specifically, for example, it issues an API key) to make a request for data stored in the service storage section 34 of the server 3. For example, an API such as "call (http://appserver3.com?getData ("data001"))" is issued to request the server 3 to send "data001."

Figures 12, 13, 14:
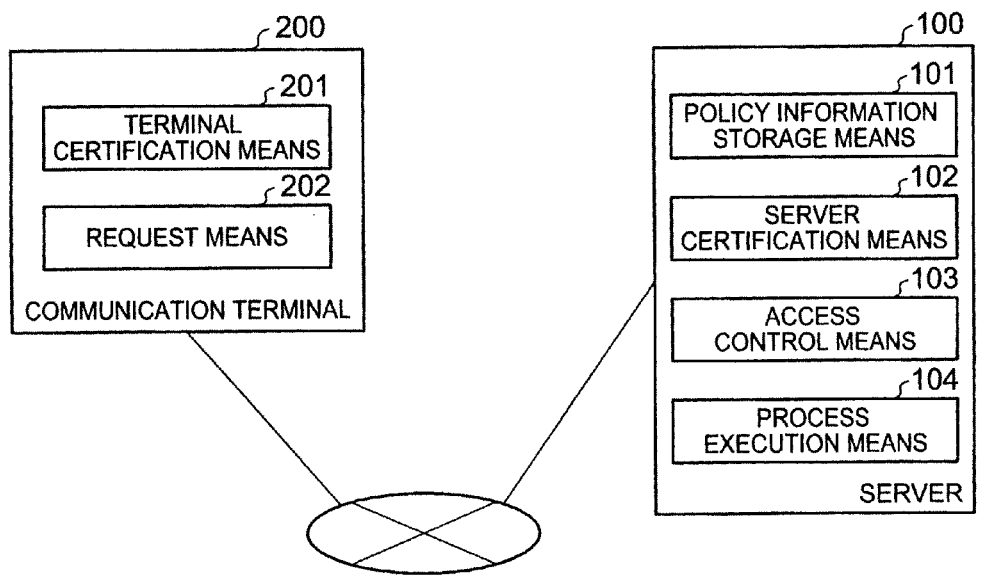
FIG. 12 is an explanatory drawing showing the URL of the web server and the hash value for the certificate stored in the certification information storage section in the exemplary embodiment.
FIG. 13 is an explanatory drawing showing an example of a hash value for a root certificate issued by each certificate authority.
FIG. 14 is a block diagram showing a general outline of the present invention.

When the web application issues the API, the request means 26 detects it (specifically, for example, the request means 26 detects that the application execution means 27 has issued the API key based on the program control of the web application). Then, certification information corresponding to the requesting web application (actually, a server, i.e., the application server 1 from which the web application is delivered) is fetched from the certification information storage section 25. The request means 26 sends the server 3 a request (specifically, for example, access request information) with this certification information added thereto. FIG. 12 is an explanatory drawing showing an example in which the certification information is added to an HTTP request header. In the example shown in FIG. 12, "referer" is set as information on the requesting application and "x-cert-hash" is set as the certification information.

Next, (3) the request certification process executed by the server 3 will be described. When the request accepting means 31 accepts the request from the communication terminal 2 (for example, when it receives the access request information sent from the communication terminal 2), the request certification means 32 acquires the certification information from the HTTP header. For example, as the method of acquiring the certification information from the HTTP header, there is a method of calling an API such as "getHTTPHeader ("referer")" to acquire the information on the requesting web application and the certification information. The request certification means 32 verifies whether the acquired certification information matches the certificate stored in the certificate storage section 33.

FIG. 13 is an explanatory drawing showing an example of a hash value for a root certificate issued by each certificate authority. In this example, as shown in FIG. 13, it is assumed that the hash value for the certificate is pre-calculated and each hash value is associated with the ID of the CA as an issuer of the certificate. Thus, since the hash value indicated by the certification information sent from the communication terminal 2 matches the hash value for CA_1, it is found that the requesting application (the application server 1 storing the application) is surely authorized by the CA_1.

Here, when they do not match, the communication terminal 2 recognizes that the requesting application (application stored on the application server 1) is a trusted application, while the server 3 (in the policy of the server 3) recognizes that the application (application stored on the application server 1) is an untrusted application. For example, it is considered that it happens like this (i.e., that the hash value indicated by the certification information sent from the communication terminal 2 does not match the hash value for CA_1) when the application is certified by a certificate (additional certificate) added by the user on the communication terminal 2. In other words, when a request (specifically, for example, access request information) with a hash value for the additional certificate given thereto) is sent, since this certificate does not exist on the server side (e.g., it is not stored in the certificate storage section 33 of the server 3), it follows that the certificate given to the request does not match the certificate contained in the server in the step of request certification.

Upon completion of the certification process, the access control means 35 checks on a policy for CA_1 (for the application having the certificate issued by the CA_1). As shown in FIG. 7 mentioned above, since the policy to allow the application having the certificate issued by the CA_1 to access data001 is stored in the policy storage section 36, it is determined that the right of access is given. After that, the request accepting means 31 fetches data001 stored in the service storage section 34, and returns (sends), to the communication terminal 2, an HTTP response with the data001 added thereto.

The web application is targeted in this example, but it is not limited thereto. For example, it can be applied to a JAVA (registered trademark) application or the like. In this case, upon downloading a JAVA application, a JAVAVM (JAVA Virtual Machine) as its execution environment certifies the application and manages the application and a certificate associated with the application. Then, when the JAVA application requests a server to send data, the JAVAVM detects the request and sends the server the request with hash value for a certificate corresponding to the request added thereto so that the request can be made.

The present invention can also be applied to other applications, i.e., it can be applied to a device-specific native application, an application created in a script language, and the like. Further, the present invention can be applied to contents as well as the applications, i.e., it can be applied to HTML files and the like. In the case of an HTML file, when an image file is read with its own tag (such as A tag), it may include a link to any other site. In this case, it is determined on the other site from which HTML file the access is made so that the determination can be used to perform access control related to providing the image file or the like.

Next, a general outline of the present invention will be described. FIG. 14 is a block diagram showing a general outline of the present invention. As shown in FIG. 14, an access control system according to the present invention includes a server (corresponding to the server 3 shown in FIG. 1) 100 and a communication terminal (corresponding to the communication terminal 2 shown in FIG. 1) 200. Then, the communication terminal 200 includes terminal certification means (corresponding to the application certification means 23 shown in FIG. 1) 201 and request means (corresponding to the request means 26 shown in FIG. 1) 202. The server 100 includes policy information storage means (corresponding to the policy storage section 36 shown in FIG. 1) 101, server certification means (corresponding to the request certification means 32 shown in FIG. 1) 102, access control means (corresponding to the access control means 35 shown in FIG. 1) 103, and process execution means (corresponding to the request accepting means 34 shown in FIG. 1) 104.

The terminal certification means 201 uses an electronic certificate added to a content to execute a certification process on the content and to manage, in association with each other, the content certified in the certification process and certification information on the content as information based on the electronic certificate to indicate that the content is certified in the certification process.

Upon accessing the server 100 associated with the execution of a content, the request means 202 sends the server 100 a request including the certification information on the content and requested content information indicative of a process requested of the server 100.

The policy information storage means 101 prestores policy information indicating whether to execute the process according to the request based on the certification information and the requested content information included in the request sent from the communication terminal 200.

The server certification means 102 performs certification on the request based on the certification information included in the request sent from the communication terminal 200.

When the server certification means 102 certifies the request, the access control means 103 decides on whether to execute the process indicated by the requested content information based on the policy information stored in the policy information storage means 101, and the certification information and the requested content information included in the request.

When the access control means 103 decides to execute the process indicated by the requested content information, the process execution means 104 executes the process.

According to such a configuration, since the request means 202 of the communication terminal 200 sends the server 100 the certification information on the content, the server 100 can figure out upon which content the request is based (specifically, by which certificate authority the content is certified). Then, since the access control means 103 of the server 100 decides on whether to execute the process according to the request based on the policy information stored in the policy information storage means 101, access control can be performed based on the policy information stored in the policy information storage means 101 of the server 100. Thus, for example, even if the user of the communication terminal 200 adds a certificate and the content is certified by the certificate, since access is deniable based on the policy information on the server 100, access unintended by the server 100 is never be made. In other words, a policy based on a certificate issued by a predetermined certificate authority is set on the server 100 to enable access control for each content.

In each of the aforementioned exemplary embodiments, the following access control systems are also disclosed:

An access control system in which the terminal certification means 201 manages a hash value for an electronic certificate of a content, a fingerprint, or an electronic certificate itself as certification information on the content in association with the content.

An access control system in which verification means verifies whether an electronic certificate used in a certification process for a content matches an electronic certificate prestored in storage means. According to such a configuration, when the communication terminal 200 accesses the server 100, the server 100 can determine whether the content of an access source is certified by a certificate originally installed. This eliminates the need to execute the certification process on the server 100 side, enabling reduction in the processing load on the server 100.

An access control system in which the certification information on the content managed by the terminal certification means in association with the content includes the ID of an issuer of the electronic certificate of the content. An access control system in which an application program is handled as the content.

A configuration in which the communication terminal 200 includes verification means (corresponding to the verification means 29 shown in FIG. 8) and the server 100 does not include the server certification means 102 is also disclosed as follows:

A communication terminal configured such that, upon accessing the server 100, the verification means verifies whether the electronic certificate used in the certification process for the content is a predetermined electronic certificate.

According to such a configuration, in addition to the above-mentioned effect, since it is verified on the communication terminal 200 side whether the electronic certificate used in the certification process for the content is a predetermined electronic certificate, there is no need to execute the certification process on the server 100 side. This can lead to reduction in the processing load on the server 100.

As described above, although the present invention is described with reference to the exemplary embodiments and example, the present invention is not limited to the aforementioned exemplary embodiments and example. Various changes that can be understood by those skilled in the art within the scope of the present invention can be made to the configurations and details of the present invention.

This application claims priority based on Japanese Patent Application No. 2009-255908, filed on Nov. 9, 2009, the entire disclosure of which is incorporated herein by reference.

Industrial Applicability

The present invention can be applied to access restriction upon using a web service from a communication device such as a PC or a cellular phone.

The invention claimed is:

1. An access control system, comprising:
a communication terminal connected to a server through a communication network, wherein:
the communication terminal comprises:
a certificate storage section which stores an electronic certificate that is identical with an electronic certificate managed in the server; and
an additional certificate storage section which stores separate from the certificate storage section, an electronic certificate added by the communication terminal; and
a terminal certification unit which executes a certification process on a content using an electronic certificate added to the content and managing, in association with each other, the content certified in the certification process and certification information on the content as information based on the electronic certificate to indicate that the content is certified in the certification process; and
a verification unit, upon accessing the server, which verifies whether the electronic certificate used in the certification process for the content matches the electronic certificate stored in either one of the certificate storage section and the additional certificate storage section; and
a request unit which, when the verification unit determines that the electronic certificate used in the certification process matches the predetermined electronic certificate stored in the certificate storage section or the additional certificate storage section, sends the server a request including the certification information on the content and requested content information indicative of a process requested of the server, and
the server comprises:
a policy information storage unit which prestores policy information indicating whether to execute the process according to the request based on the certification information and the requested content information included in the request sent from the communication terminal;
a server certification unit which performs certification again by certifying the request based on the certification information included in the request sent from the communication terminal;
an access control unit which, when the server certification unit certifies the request, decides on whether to execute the process indicated by the requested content information based on the policy information stored in the policy information storage unit, and the certification information and the requested content information included in the request; and a process execution unit executes the process when the access control unit decides to execute the process indicated by the requested content information, and wherein when the electronic certificate indicated by the certification information included in the request matches an electronic certificate prestored in storage unit, the server certification unit certifies the request.

2. The access control system according to claim 1, wherein the terminal certification unit manages, in association with the content, a hash value for the electronic certificate of the content as certification information on the content.

3. The access control system according to claim 1, wherein the terminal certification unit manages, in association with the content, a fingerprint for the electronic certificate of the content as certification information on the content.

4. The access control system according to claim 1, wherein the terminal certification unit manages, in association with the content, the electronic certificate of the content as certification information on the content.

5. An access control system: comprising:
a server and a communication terminal connected to a server through a communication network,
wherein:
the communication terminal comprises:
a certificate storage section which stores an electronic certificate that is identical with an electronic certificate managed in the server;
an additional certificate storage section which stores an electronic certificate added by a user of the communication terminal;
a terminal certification unit which executes a certification process on a content using an electronic certificate added to the content and managing, in association with each other, the content certified in the certification process and certification information on the content as information based on the electronic certificate to indicate that the content is certified in the certification process;
a verification unit which, upon accessing the server, verifies whether the electronic certificate used in the certification process for the content matches the electronic certificate stored in the certificate storage section or the additional certificate storage section; and
a request unit which, when the verification unit determines that the electronic certificate used in the certification process matches the electronic certificate stored in the certificate storage section or the additional certificate storage section, sends the server a request including the certification information on the content and requested content information indicative of a process requested of the server, and
the server comprises:
a policy information storage unit which prestores policy information indicating whether to execute the process according to the request based on the certification information and the requested content information included in the request sent from the communication terminal;
an access control unit which decides on whether to execute the process indicated by the requested content information based on the policy information stored in the policy information storage unit, and the certification information and the requested content information included in the request; and a process execution unit which executes the process when the access control unit decides to execute the process indicated by the requested content information.

6. The access control system according to claim 5, wherein an ID (identification) of an issuer of the electronic certificate of the content is included in the certification information on the content managed by the terminal certification unit in association with the content.

7. The access control system according to claim 1, wherein the content is an application program.

8. An access control method by which a server executes a process in response to a request from a communication terminal,
the method, in the communication terminal, comprises:
storing an electronic certificate within a certificate storage section that is identical with an electronic certificate managed in the server; and
adding an additional certificate storage section which stores separate from the certificate storage section, an electronic certificate added by the communication terminal; and
executing a certification process on a content using an electronic certificate added to the content and managing, in association with each other, the content certified in the certification process and certification information on the content as information based on the electronic certificate to indicate that the content is certified in the certification process; and
upon accessing the server, verifying whether the electronic certificate used in the certification process for the content matches the electronic certificate stored in either one of the certificate storage section and the additional certificate storage section; and
determining that the electronic certificate used in the certification process matches the predetermined electronic certificate stored in the certificate storage section or the additional certificate storage section, sending the server a request including the certification information on the content and requested content information indicative of a process requested of the server, and
the method, in the server, comprises:
performing certification again by certifying the request based on the certification information included in the request sent from the communication terminal;
when the request is certified, deciding on whether to execute the process indicated by the requested content information based on policy information indicating whether to execute the process according to the request, and the certification information and the requested content information included in the request; and
executing the process when it is decided that the process indicated by the requested content information is executed,
wherein when the electronic certificate indicated by the certification information included in the request matches an electronic certificate prestored in storage unit, the server certifies the request.

9. The access control system according to claim 1, wherein the server certification unit certifies the request by comparing the electronic certificate indicated by the certification information included in the request matches the electronic certificate prestored in the storage unit.

10. The access control method according to claim 8, wherein the server certifies the request by comparing the electronic certificate indicated by the certification information included in the request matches the electronic certificate prestored in the storage unit.

\* \* \* \* \*